US008842755B2

(12) United States Patent
Ancora (10) Patent No.: US 8,842,755 B2
(45) Date of Patent: Sep. 23, 2014

(54) PROCESS FOR DECODING ALAMOUTI BLOCK CODE IN AN OFDM SYSTEM, AND RECEIVER FOR THE SAME

(75) Inventor: Andrea Ancora, Nice (FR)

(73) Assignee: Ericsson Modems SA, Plan-les-Ouates (CH)

( * ) Notice: Subject to any disclaimer, the term of this patent is extended or adjusted under 35 U.S.C. 154(b) by 69 days.

(21) Appl. No.: 13/504,103

(22) PCT Filed: Oct. 25, 2010

(86) PCT No.: PCT/EP2010/006508
§ 371 (c)(1),
(2), (4) Date: Jul. 16, 2012

(87) PCT Pub. No.: WO2011/050935
PCT Pub. Date: May 5, 2011

(65) Prior Publication Data
US 2012/0269302 A1    Oct. 25, 2012

(30) Foreign Application Priority Data
Oct. 26, 2009 (EP) .................................... 09368041

(51) Int. Cl.
| *H04K 1/10* | (2006.01) |
| *H04L 25/03* | (2006.01) |
| *H04L 1/06* | (2006.01) |
| *H04L 27/26* | (2006.01) |
| *H04L 5/00* | (2006.01) |

(52) U.S. Cl.
CPC ........ *H04L 1/0606* (2013.01); *H04L 25/03006* (2013.01); *H04L 1/0631* (2013.01); *H04L 27/2647* (2013.01); *H04L 1/0668* (2013.01); *H04L 5/0007* (2013.01)
USPC .......................................... 375/260; 375/340

(58) Field of Classification Search
None
See application file for complete search history.

(56) References Cited

U.S. PATENT DOCUMENTS

| 2006/0215773 A1 | 9/2006 | Jeon et al. | |
| 2007/0268981 A1* | 11/2007 | Heiskala | 375/267 |
| 2009/0022235 A1* | 1/2009 | Zhang et al. | 375/260 |

FOREIGN PATENT DOCUMENTS

| EP | 1185001 A2 | 6/2002 |
| WO | 2007066935 A2 | 6/2007 |

OTHER PUBLICATIONS

Patent Cooperation Treaty; International Search Report of PCT/EP2010/006508; Mar. 17, 2011; Marta Moreno; 4 pages.
Xue Wen et al: "LLL lattice reduction-based detection of joint VBLAST and SFBC in MIMO/OFDM systems", Communications, Circuits and Systems, vol. 1, May 27, 2005, pp. 194-198.

(Continued)

*Primary Examiner* — Leon-Viet Nguyen
(74) *Attorney, Agent, or Firm* — Howison & Arnott, LLP (57) ABSTRACT

A process for decoding a signal being representative of a Space Time or Frequency Block coding during two signaling periods (STBC) or two parallel channels (SFBC) is provided. The process receives an OFDM signal received from at least one antenna. The process also performs an OFDM demodulation in order to generate N frequency domain representations of the received signal. Then the process performs a decoding process on said OFDM demodulated signal and groups the received signal in word code, $Y=(y_1, y_2)$, to represent the signal that was received during two signaling periods (STBC) or two parallel channels (SFBC). The word code is then decoded into a matrix after which a lattice reduction algorithm is applied to the matrix in order to transform the matrix into a reduced matrix having a near orthogonal vector. Then it performs a detection process on the reduced matrix to improve noise and interference immunity.

10 Claims, 5 Drawing Sheets

(56) References Cited

OTHER PUBLICATIONS

Huan Yao et al: "Lattice-reduction-aided detectors for MIMO communication systems", GLOBECOM '02, vol. 1, Nov. 17, 2002, pp. 424-428.

Di Wu et al: "A Programmable Lattice-Reduction Aided Detector for MIMO-OFDMA", Citcuits and Systems for Communications, May 26, 2008, pp. 293-297.

Siavash M. Alamouti: "A Simple Transmit Diversity Technique for Wireless Communications", IEEE Journal on Select Areas in Communications, vol. 16, No. 8, Oct. 1998, pp. 1451-1458.

* cited by examiner

Prior Art

PROCESS FOR DECODING ALAMOUTI BLOCK CODE IN AN OFDM SYSTEM, AND RECEIVER FOR THE SAME

CROSS-REFERENCE TO RELATED APPLICATIONS

This application is a U.S. National Phase application submitted under 35 U.S.C. §371 of Patent Cooperation Treaty application serial no. PCT/EP2010/006508, filed Oct. 25, 2010, and entitled PROCESS FOR DECODING ALAMOUTI BLOCK CODE IN AN OFDM SYSTEM, AND RECEIVER FOR THE SAME, which application claims priority to European patent application serial no. 09368041.1, filed Oct. 26, 2009, and entitled PROCESS FOR DECODING ALAMOUTI BLOCK CODE IN AN OFDM SYSTEM, AND RECEIVER FOR THE SAME.

Patent Cooperation Treaty application serial no. PCT/EP2010/006508, published as WO 2011/050935, and European patent application serial no. EP 09368041.1, are incorporated herein by reference.

TECHNICAL FIELD

The invention relates to the field of wireless communication and more particularly to a process for decoding ALAMOUTI block code in an OFDM system, and a receiver for doing the same.

BACKGROUND

Digital wireless communications are being widely used throughout the world particularly with the latest development of the Orthogonal Frequency Division Multiplex (OFDM systems) and the latest evolution, namely the so-called Long Term Evolution (LTE), DVB-H, WiFi 802.11 and WiMax 802.16 systems.

OFDM is a frequency-division multiplexing (OFDM) scheme utilized as a digital multi-carrier modulation method. As it is well known to one skilled in the art, OFDM systems demonstrate significant advantages in comparison to single-carrier schemes, particularly in their ability to cope with severe channel conditions (i.e., channel attenuation, narrowband interference, frequency-selective fading).

The combination of OFDM and multiple antennas in either the transmitter or receiver is attractive to increase a diversity gain.

In that respect, the well known ALAMOUTI scheme, as disclosed in document "*A simple transmit diversity technique for wireless communications*", by in S. M. ALAMOUTI, IEEE J. Selected Areas of Communications, vol. 16, pp. 1451-1458, October 1998, has revealed to be extremely efficient in allowing wireless and cellular systems to increase link reliability. Its efficiency proves because of the extremely simple encoding technique at the transmitter and more importantly in the low complexity linear and optimal decoding which can also easily be extended to multiple receiving antenna case.

Figure 1:
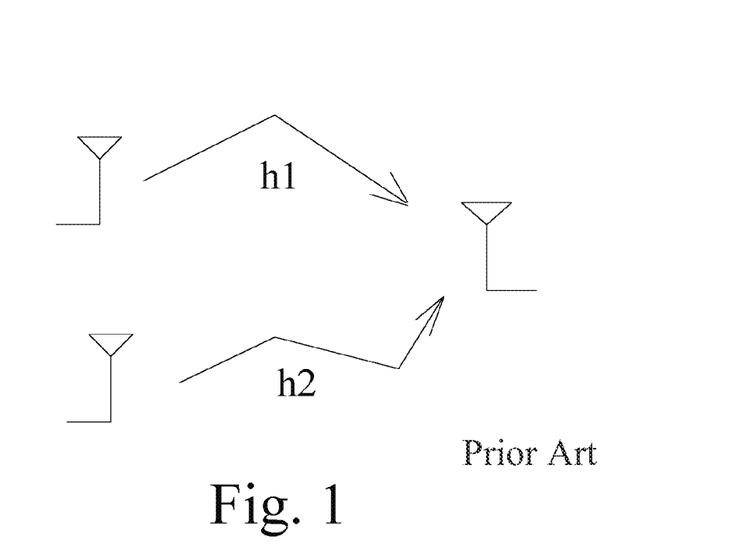
FIG. 1 illustrates the basic scheme of the STBC ALAMOUTI coding.

With respect to FIG. 1, there is recalled the general principle of the transmission scheme in accordance with the ALAMOUTI Space Time Block coding.

Considering, as shown in the figure that the following sequence of complex symbols should be transmitted: $x_1, x_2, x_3, x_4$.

In normal transmission, a first time slot would be allocated for the transmission of $x_1$, a second time slot would be allocated for $x_2$ etc.

Now, considering the ALAMOUTI scheme and more particularly the Space-Time Block Code (STBC), those symbols are now grouped in two.

During the first time slot, $x_1$ and $x_2$ are respectively transmitted by the first and second antenna while, in the second time slot, $-x_2^*$ and $x_1^*$ are respectively sent through the first and second antenna. In the third time slot, $x_3$ and $x_4$ are transmitted by the first and second antenna while, in the fourth time slot, the two antennas transmit $-x_4^*$ and $x_3^*$, respectively, and so on.

It can be noticed that such block coding has no effect on the data rate since two time slots are still required for the transmission of two symbols.

In the first time slot, the receiver receives the signal:

$$y_1 = h_1 x_1 + h_2 x_2 + n_1$$

In the second time slot, the received signal is, $$y_2 = -h_1 x_2^* + h_2 x_1^* + n_2$$

where $y_1, y_2$ is the received symbol on the first and second time slot respectively, $h_1$ is the channel from $1^{st}$ transmit antenna to receive antenna, $h_2$ is the channel from 2nd transmit antenna to receive antenna, $x_1, x_2$ are the transmitted symbols and $n_1, n_2$, is the noise on $1^{st}$ and $2^{nd}$ time slots.

What can be expressed as follows:

$$\begin{bmatrix} y_1 \\ y_2^* \end{bmatrix} = \begin{bmatrix} h_1 & h_2 \\ h_2^* & -h_1^* \end{bmatrix} \begin{bmatrix} x_1 \\ x_2 \end{bmatrix} + \begin{bmatrix} n_1 \\ n_2^* \end{bmatrix} \quad (1)$$

Let us define $$H = \begin{bmatrix} h_1 & h_2 \\ h_2^* & -h_1^* \end{bmatrix}.$$

And $H^+$ being the pseudo inverse defined as: $H^+ = (H^H H)^{-1} H^H$

Solving the equation Y=Ax above, leads to the following $$\begin{bmatrix} \hat{x}_1 \\ \hat{x}_2^* \end{bmatrix} = (H^H H)^{-1} H^H \begin{bmatrix} y_1 \\ y_2^* \end{bmatrix} \quad (2)$$

Applied to the frequency domain rather than in the time domain, the ALAMOUTI block coding results, in the so-called Space-Frequency Block Code (SFBC), two consecutive and neighboring subcarriers within the same OFDM symbol, instead of two consecutive time slots.

The use of such space block significantly increases the link reliability of wireless and cellular systems without requiring a significant increase in the complexity of the receiver.

It is particularly effective because of the extremely simple encoding technique at the transmitter and more importantly in the low complexity linear and optimal decoding which can also easily be extended to multiple receiving antenna case.

However, such benefit strongly relies on the assumption that the channel remains constant over two time slots or, in OFDM, between two neighboring subcarriers or resources.

Such assumption of static conditions over the two periods or channel uses spanning its transmission is actually never verified in practice and remains ideal.

In OFDM, the channel is selective because of the time-varying or frequency selective nature of the terminal mobility and the rich scattering of the wireless environment:

long channel delay spread, e.g., hilly terrain propagation low channel coherence bandwidth, i.e., high relative speed between the base station (BS) and the wireless mobile receiver.

When the static assumption is not verified, the demodulation process tends to become much more complicated.

Indeed, the conventional low complexity methods, such as the very basic matched filter, and even the more sophisticated linear processings (Zero-forcing, MMSE equalization) shows little efficiency and remain sub-optimal.

The well known Maximum Likelihood would be optimal but becomes highly complex as the size of the modulation increases (exponential complexity of the order of $2^M$), where M is the order of the modulation used, i.e., M=2 for QPSK, M=4 for 16-QAM and M=6 for 64-QAM.

On the other hand, the Near-ML detection based on Sphere Decoding: optimal (slight decrease in coding gain) could be another solution, but still shows high level of complexity (polynomial complexity in function of modulation order $M^3$ in average).

Therefore, there is a desire for a new method which allows decoding of the ALAMUTI code, with low complexity, even in the case where the channel shows variation between two neighboring subcarriers or OFDM blocks.

SUMMARY

Embodiments of the present invention provide a process for decoding ALAMOUTI block code in an OFDM system which requires little complexity.

Embodiments of the present invention provide a new process for performing improved signal detection in of ALAMOUTI block-codes (SFBC or STBC) in presence of highly selective channels (long delay spread or high Doppler, respectively).

These and other embodiments of the invention are achieved by means of the process for decoding a signal being representative of a STBC or SFBC, comprising the transmission, firstly, of a pair of finite-alphabet complex symbols $x_1$ and $x_2$ with, secondly, the symbols $-x_2^*$ and $x_1^*$ (*being the conjugate operation) during two signaling periods (STBC) or two parallel channels (SFBC), which comprises the steps of:

receiving an OFDM signal received from at least one antenna;

performing an OFDM demodulation in order to generate N frequency domain representations of said received signal, each associated to one carrier;

performing a decoding process applied on said OFDM demodulated signal, in order to group the received signal in word code $Y=(y_1, y_2)$ being representative of the received signal received during two signaling periods (STBC) or two parallel channels (SFBC), decoding said word code $Y=(y_1, y_2)$ in order to compute the transmitted symbols $x_1$ and $x_2$ in accordance with the following formulation:

$$\begin{bmatrix} y_1 \\ y_2^* \end{bmatrix} = \begin{bmatrix} h_1 & h_2 \\ \tilde{h}_2^* & -\tilde{h}_1^* \end{bmatrix} \begin{bmatrix} x_1 \\ x_2 \end{bmatrix} + \begin{bmatrix} n_1 \\ n_2^* \end{bmatrix}$$

Or $$y = Hx + n$$

where $h_1$ and $h_2$ being representative of the channel applicable to the transmission of $x_1$ and $x_2$ while $\tilde{h}_1'$ and $\tilde{h}_2$ are representative of the channel applicable to the transmission of $-x_2^*$ and $x_1^*$;

$n_1$, $n_2$, being the noise.

The process further involves a lattice reduction on matrix $H=(b_1, b_2)$ in order to transform said matrix in a reduced matrix $Hred=(b'_1, b'_2)$ having vector being close to orthogonal, then followed by a detection process applied on said reduced matrix in order to improve immunity with respect to noise and interference.

Such process is a non linear method—which efficiency is close to that of the Maximum Likelihood (Near ML) but which offers a complexity which is in average polynomial (cube) in the channel matrix size but remains independent on the size of the constellation.

Therefore, the complexity can be greatly reduced exploiting channel coherence

Furthermore, in the particular 2×2 ALAMOUTI case, the use of the Lattice Reduction method defined above proves very efficient.

The process is applicable for both STBC coding, wherein the transmission of symbol $x_1$ (resp. $x_2$) and symbol $-x_2^*$ (resp. $x_1^*$) are performed during two consecutive OFDM frames, or for SFBC wherein the same are transmitted through two consecutive carriers within the same OFDM frame.

In one embodiment, the lattice reduction applied on each carrier k is based on an iterative algorithm with an initialization performed with the values of the reduced channel processed for carrier k−1. This has for result of significant lowering the complexity of the receiver.

In one embodiment, the lattice reduction comprises the steps of:

checking the correlation by testing whether

I Re $\{<b_1, b_2>\} | \leq ½$ Il $b_1$Il$^2$ and

I Im $\{<b_1, b_2>\} | \leq ½$ Il $b_1$Il$^2$, and, if not, replace $b_2$ with $$b_2 - \left\lfloor \frac{(b_1, b_2)}{\|b_1\|^2} \right\rceil b_1$$

and repeat again.

Optionally, the process further comprises testing the modulus of $b_1$ and $b_2$, i.e., square root of the sum of the squared value of each element of the vector.

The invention embodiments also provide a receiver for an OFDM communication system which can decode ALAMOUTI SFBC or STBC decoding, which comprises:

means for receiving an OFDM signal received from at least one antenna;

means for performing an OFDM demodulation in order to generate N frequency domain representations of said received signal, each associated to one carrier;

means for performing a decoding process applied on said OFDM demodulated signal, in order to group the received signal in word code $Y=(y_1, y_2)$ being representative of the received signal received during two signaling periods (STBC) or two parallel channels (SFBC), means for decoding said word code $Y=(y_1, y_2)$ in order to compute the transmitted symbols $x_1$ and $x_2$ in accordance with the following formulation:

$$\begin{bmatrix} y_1 \\ y_2^* \end{bmatrix} = \begin{bmatrix} h_1 & h_2 \\ \tilde{h}_2^* & -\tilde{h}_1^* \end{bmatrix} \begin{bmatrix} x_1 \\ x_2 \end{bmatrix} + \begin{bmatrix} n_1 \\ n_2^* \end{bmatrix}$$

where $h_1$ and $h_2$ being representative of the channel applicable to the transmission of $x_1$ and $x_2$ while $\tilde{h}_1'$ and $\tilde{h}_2$ are representative of the channel applicable to the transmission of $-x_2^*$ and $x_1^*$;

$n_1$ $n_2$, being the noise.

The receiver further comprises:

means for applying a lattice reduction algorithm on said matrix $H=(b_1, b_2)$ in order to transform said matrix in a reduced matrix $Hred=(b'_1, b'_2)$ having vector being close to orthogonal;

means for performing a detection process on said reduced matrix in order to improve immunity with respect to noise and interference.

In one embodiment, the lattice reduction can be combined with Zero Forcing (ZF), Matched Filter (MF) or Decision Feedback (DF) detection.

The invention is particularly suitable for embodying an US equipment for the Long Term Evolution (LTE), such as a mobile telephone.

BRIEF DESCRIPTION OF THE DRAWINGS

Other features of one or more embodiments of the invention will best be understood by reference to the following detailed description when read in conjunction with the accompanying drawings.

DETAILED DESCRIPTION

There will now be described one particular embodiment of a process which is applicable to any OFDM communication systems, such as Long Term Evolution (LTE), Digital Video Broadcasting Handheld (DVB-H), IEEE 802.11b Direct Sequence Spread Spectrum or Wifi, Wimax etc.

Clearly, the process is more general and could be applied to any other form of OFDM system.

More generally, while the invention shows high efficiency in the simple 2×2 ALAMUTI case, it can be applied to more than two antennas.

With respect to FIG. 2, there is illustrated a block diagram of a Space-Time block coding communication system complying with the ALAMOUTI scheme and which can advantageously use the process described below.

A transmitter 20 comprises a block 21 consisting of a source of information symbol, which are forwarded to a Space Time Black encoder 22 complying with the ALAMOUTI space time coding. The symbols are grouped in blocks of two symbols and are then passed to an OFDM modulation 23, and then to the Transmit Radio Frequency front-end circuits 24 supplying two transmit antennas.

A receiver 30 comprises, in addition to a Receive Radio Frequency front-end circuits 31 and an OFDM demodulator 32, a ST Block decoder 33 achieving the reverse ALAMOUTI decoding for the purpose of regenerating the original sequence of symbols which are forwarded to the decoder 34.

In order to significant simplify the structure of the demodulation, the decoding applied by block 34 on the sequence of symbols resulting from the ALAMOUTI decoding is now based on a non linear process involving an iterative process based carriers of the OFDM symbol.

In addition, for each carrier, the iterative process is initialized with the result of the lattice process computation performed on the preceding carrier.

I. Signal Model Definition

First consider a communication system between a transmitter with two antennas and a receiver with one receiving antenna. Despite this simplification, the results presented are general and can be extended to multiple receiving antennas case. The transmitter employing ALAMOUTI transmit-diversity scheme requires two signaling periods or two parallel channels to convey a pair of finite-alphabet complex symbols $x_1$ and $x_2$: during the first symbol period, the first antenna sends $x_1$ and the second antenna sends $x_2$; in the second period, the symbols $-x_2^*$ and $x_1^*$ are respectively transmitted by first and second antenna.

Denote $h_1$ and $h_2$ the complex flat-fading channel coefficients between the two transmit antennas and the receiving antenna during the first period while $\tilde{h}_1'$ and $\tilde{h}_2$ are the channel coefficients of the second symbol period. It is easy to show that the received symbol vector can be conveniently written in matrix form as $$\begin{bmatrix} y_1 \\ y_2^* \end{bmatrix} = \begin{bmatrix} h_1 & h_2 \\ \tilde{h}_2^* & -\tilde{h}_1^* \end{bmatrix} \begin{bmatrix} x_1 \\ x_2 \end{bmatrix} + \begin{bmatrix} n_1 \\ n_2^* \end{bmatrix} \quad (3)$$

With * being the complex conjugate. The same expression can be written in a more compact way as:

$$y=Hx+n \quad (4)$$

where n is the zero-mean circularly symmetric complex Gaussian noise vector whose covariance matrix is equal to I.

Rayleigh fading channel coefficients such that $h_1$, $h_2$, $\tilde{h}_1'$ and $\tilde{h}_2$ are zero-mean circularly symmetric complex Gaussian random variables each with variance equal to $\sigma_h^2$, i.e. $E[|h_1|^2]=E[|h_2|^2]=\sigma_h^2$ with $E[\bullet]$ denoting the expectation operator;

uncorrelated transmitting antennas such that h1 and h2 are independent, i.e. $E[h_1, h_2^*]=0$.

Correlated channel coefficients between the two symbol such that $$E[h_1\tilde{h}_1^*]=E[h_2\tilde{h}_2^*]=\rho$$

where ρ is the complex correlation factor with $|\rho|^2 \le 1$. We stress the fact about ρ being complex as this is the general case. The correlated processes are generated using a first-order auto-regressive model as $$\tilde{h}_i = \rho h_i + \sqrt{1-\rho^2} w_i$$

with $w_i$ being again a zero-mean circularly symmetric complex Gaussian random variable with variance equal to $\rho_h^2$.

x being a vector such, for example, a vector of Binary Phase-Shift Keying (BPSK) symbols with $x_i \in \{\pm 1\}$.

II. Lattice Reduction for Reducing the H Matrix in the Receiver

As mentioned in the Background section, the ALAMOUTI decoding applied on the equation (4) above leads to a complex demodulation because of the non static condition of the channel during the two consecutive time interval (in Space-Time Block Coding) or between the two consecutive carriers in the OFDM symbol (in Space-Frequency Block Coding).

Figure 2:
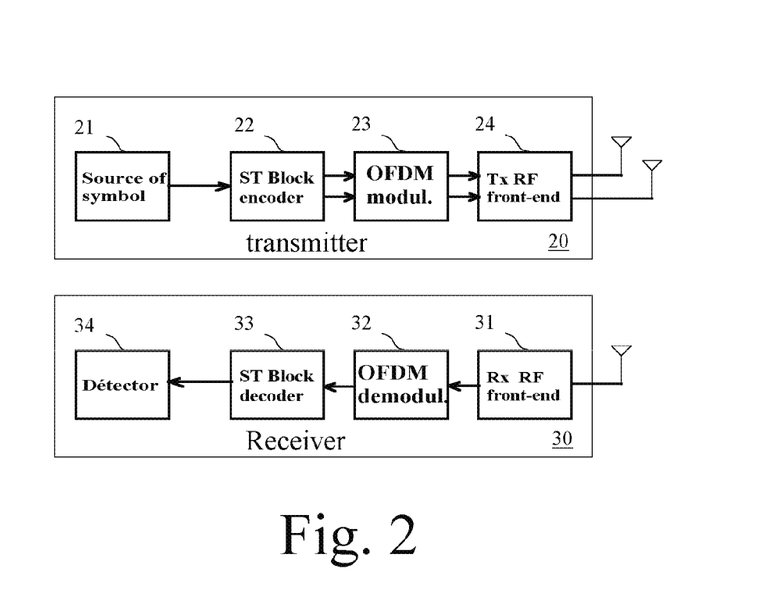
FIG. 2 illustrates the block diagram of the transmitter and the receiver for respectively carrying out the coding and the decoding of the ALAMOUTI scheme.

Such complexity in the demodulation entails the need of non linear decoding method to be applied in the receiver 30 of FIG. 2.

The inventors have discovered that one particular non linear method, based on an iterative process using lattice reduction, can provide advantageous decoding without a high level of complexity.

Lattice reduction is a non linear method whose complexity is in average polynomial (cube) in the channel matrix size but independent on constellation size, its complexity can be greatly reduced exploiting channel coherence.

It is a near ML method, hence provides quasi ML performance (at the expense of some coding gain loss). While feasible Lattice Reduction algorithms are sub-optimal compared to theoretical one (exponential complexity), it has been discovered for a 2×2 matrix case, an optimal formulation of Lattice Reduction does exist (i.e., Lattice Reduction algorithm is exactly as Korkine-Zolotarev).

Considering that H in formula (4) can be written as two vectors $b_1$ and $b_2$, such as:

$$H=(b_1,b_2),$$

the following algorithm below can be used for generating a reduced matrix X which can be used in the detection process of the Receiver.

Step 1: check the correlation

If I Re $\{<b_1, b_2>\} I \leq \frac{1}{2}$ II $b_1 II^2$ and I Im $\{<b_1, b_2>\} I \leq \frac{1}{2}$ II $b_1 II^2$, Then stop.

Where $<b_1, b_2>$ being the inner product defined as equal to $b_1^H \cdot b_2$. The inner product is representative of the projection of $b_2$ on $b_1$.

Otherwise, replace $b_2$ with $$b_2 - \left\lfloor \frac{(b_1, b_2)}{\|b_1\|^2} \right\rceil b_1$$

and go to step 2

Step 2 (optional): check the modulus (or relative power):

If I$b_2$II≥I$b_1$II, then stop. Otherwise, swap $b_1$ and $b_2$ and go to step 1.

Step 2 is optional in the case of only 2 transmitting antennas.

Such algorithm achieves, even with highly correlated values of $b_1$ and $b_2$, finding a more orthogonal basis by generating a reduced matrix Hred which improves the performance of the linear detection of the receiver (be it a ZF, MF etc.) by providing decision regions more robust against noise and interference.

Figure 3:
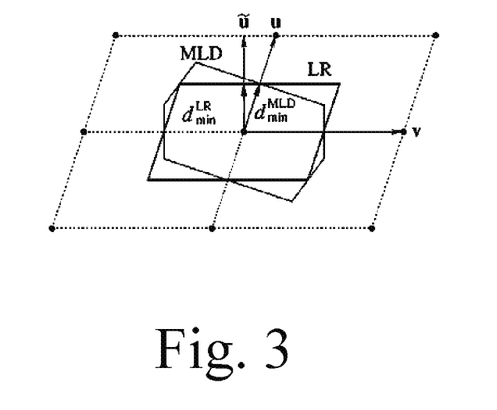
FIG. 3 illustrates the effect of the matrix reduction on the H vector.

FIG. 3 illustrates the change of basis resulting from the Lattice Reduction (LR) algorithm which is described above, in comparison with the so-called Maximum Likelihood Detector (MLD).

It has been discovered that such algorithm finds regions which are slightly smaller (representative of a coding gain loss) compared to the Maximum Likelihood (ML) method, but which still shows to be optimal. Therefore, there is achieved optimal diversity gain retrieval.

In OFDM the process is carried out for all the subcarriers k coded with ALAMOUTI scheme, and the overall complexity should scale as the complexity for one sub-carrier times the number of subcarriers.

In one embodiment, the lattice reduction algorithm is applied for each carrier k in the OFDM symbol, and the algorithm processing $H^k$ uses initialization values for parameters $b_1^k$ and $b_2^k$, which are set to be equal to the values of $b_1^{k-1}$ and $b_2^{k-2}$ b1 computed at the preceding iteration.

It has been shown such initialization causes the iterative LR algorithm to converge on its own very rapidly, thus decreasing the complexity of the whole mechanism. For instance, it has been noticed that complexity can be decreased by a factor 10 (one Lattice reduction is computed for 10 neighboring subcarriers) for low-to-medium delay spread channels.

Figure 4:
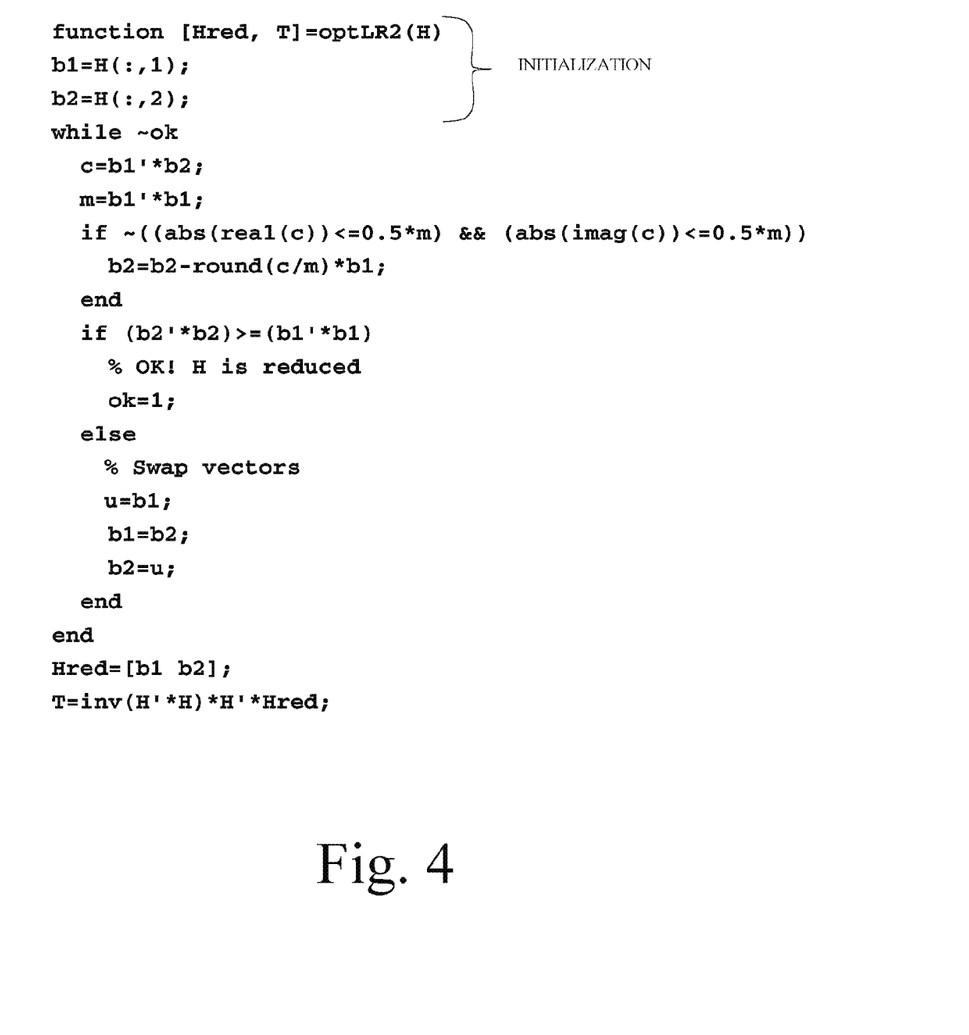
FIG. 4 illustrates an example of one embodiment of the algorithm, based on a MAT LAB formulation.

With FIG. 4, there is illustrated an example of one embodiment of the algorithm, based on a MAT LAB formulation, allowing iterative computation of the reduction matrix Hred, required for carrying out the optimal Lattice reduction (optLR).

Figure 5:
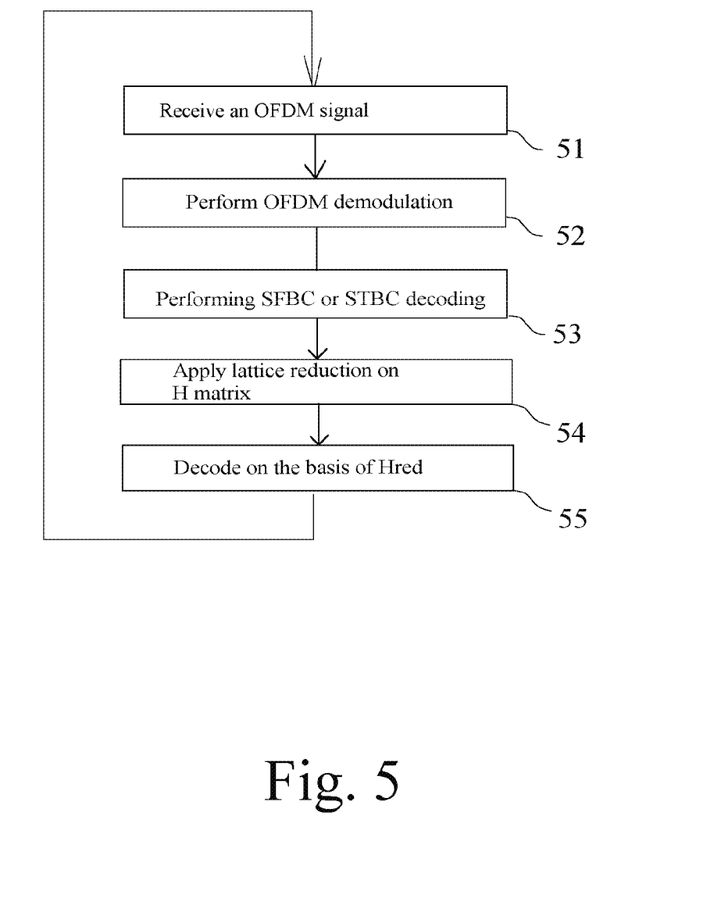
FIG. 5 illustrates the process of a new receiver achieving ALAMOUTI decoding with the use of Lattice Reduction algorithm.

With respect to FIG. 5, there is now described the different steps which are used in new receiver achieving ALAMOUTI decoding with the use of Lattice Reduction algorithm.

In a step 51, the process receives an OFDM signal received from at least one antenna.

In a step 52, the process performs an OFDM demodulation in order to generate N frequency domain representations of said received signal, each associated to one carrier.

It should be noticed that such steps 51 and 52 are conventional in the technical field of OFDM communication and well known to a skilled man.

Then, in a step 53, the process proceeds with a decoding process applied on the OFDM demodulated signal, in accordance with the particular coding being utilized, namely the Space Time Block Code (STBC) or the Space-Frequency Block Code (SFBC).

Such ALAMOUTI decoding results in the generation of a word code Y=($y_1$, $y_2$).

Then, the process proceeds with the decoding of the word code Y=($y_1$, $y_2$) in order to compute the transmitted symbols $x_1$ and $x_2$ in accordance with the formula (3) above.

This is achieved, as shown in a step 54, by applying a lattice reduction algorithm on said matrix H=($b_1$, $b_2$) in order to transform said matrix in a reduced matrix Hred=($b'_1$, $b'_2$) having vector being close to orthogonal.

In one particular embodiment, the lattice reduction algorithm is applied with an initialization step which includes the values of the reducted matrix which were computed by the preceding iteration, thus taking a great advantage of the channel coherence.

Then, in a step 55, the process proceeds with the decoding of the received symbols using the reduced Hred matrix, and then proceed again with step 51 for the purpose of processing new samples.

Figure 6:
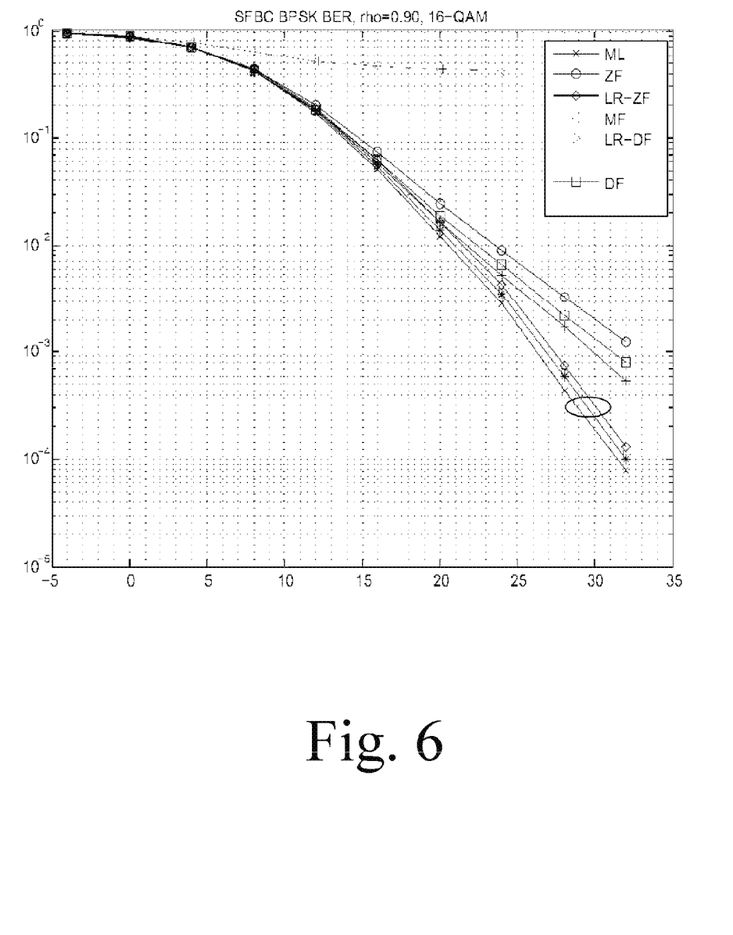
FIG. 6 illustrates simulation results on the Block Error Rate for the new process in comparison with known linear and non linear algorithms.

With respect to FIG. 6, there is illustrates some simulation results showing the evolution of the Block Error Rate (BER) as a function of the Signal to Noise ration, for different combinations of the proposed method with conventional methods:

ML: Maximum Likelihood;
ZF: Zero-forcing;
LR-ZF Lattice Reduction-Zero Forcing
MF: Matched Filter
DF: Decision Feedback

The invention claimed is:

1. A process for decoding a signal being representative of a Space Time Block coding (STBC) or Space Frequency Block coding (SFBC) based on a transmission, firstly, of a pair of finite-alphabet complex symbols $x_1$ and $x_2$, and secondly, of symbols $-x_2^*$ and $x_1^*$, wherein * is a conjugate operation, during two parallel channels (SFBC), wherein the process comprises:

receiving an OFDM signal, from at least one antenna, by a receiver comprising one single antenna;

performing an OFDM demodulation in order to generate N frequency domain representations of the received OFDM signal, each N frequency domain representation being associated to one carrier;

performing a decoding process applied on the demodulated OFDM signal, in order to group the received OFDM signal in word code, $Y=(y_1, y_2)$, being representative of the received OFDM signal received during two signaling periods (STBC) or two parallel channels (SFBC);

decoding the word code, $Y=(y_1, y_2)$, in order to compute transmitted symbols $x_1$ and $x_2$ in accordance with a formulation, $$\begin{bmatrix} y_1 \\ y_2^* \end{bmatrix} = \begin{bmatrix} h_1 & h_2 \\ \tilde{h}_2^* & -\tilde{h}_1^* \end{bmatrix} \begin{bmatrix} x_1 \\ x_2 \end{bmatrix} + \begin{bmatrix} n_1 \\ n_2^* \end{bmatrix}$$

Or $$y = Hx + n$$

wherein H is a matrix, $h_1$ and $h_2$ are representative of the channel applicable to the transmission of $x_1$ and $x_2$ while $\tilde{h}_1'$ and $\tilde{h}_2$ are representative of the channel applicable to the transmission of $-x_2^*$ and $x_1^*$, and wherein $n_1$ and $n_2$ are noise, wherein decoding the word code comprises:
applying a lattice reduction algorithm on the matrix H, $H=(b_1, b_2)$, in order to transform the matrix H into a reduced matrix $Hred=(b'_1, b'_2)$ comprising vectors that are substantially orthogonal, wherein the lattice reduction algorithm on each carrier k is based on an iterative algorithm that was initialized based on values $(b_1^{k-1}, b_2^{k-2})$ computed at a preceding iteration;

wherein the lattice reduction algorithm comprises:
checking the correlation by testing whether
I Re $\{b_1, b_2>\} 1 \le \frac{1}{2} \text{Il } b_1 \text{Il}^2$ and
I Im $\{<b_1, b_2>\} 1 \le \frac{1}{2} \text{Il } b_1 \text{Il}^2$, and, if not,
replacing $b_2$ with $$b_2 - \left\lfloor \frac{(b_1, b_2)}{\|b_1\|^2} \right\rfloor b_1$$

and repeating the checking step again; and performing a detection process on the reduced matrix Hred in order to minimize noise and interference immunity.

2. The process according to claim 1, wherein the coding is STBC coding such that the transmission of symbol $x_1$ (resp. $x_2$) and symbol $-x_2^*$(resp. $x_1^*$) occur during two consecutive OFDM frames.

3. The process according to claim 1, wherein the coding is a SFBC coding such that the transmission of symbol $x_1$ (resp. $x_2$) and symbol $-x_2^*$(resp. $x_1^*$) occur through two consecutive carriers in one OFDM frame.

4. The process according to claim 1, wherein the lattice reduction algorithm further comprises an optional step of testing the length of $b_1$ and $b_2$.

5. A receiver for decoding a signal being representative of a Space Time or Frequency Block coding based on a transmission, firstly, of a pair of finite-alphabet complex symbols $x_1$ and $x_2$ with, secondly, the symbols $-x_2^*$ and $x_1^*$ (* being the conjugate operation) during two signaling periods (STBC) or two parallel channels (SFBC), the receiver comprising:

one antenna;

a receive RF front end circuit adapted to receive an OFDM signal via the one antenna;

an OFDM demodulator adapted to generate a demodulated OFDM signal comprising N frequency domain representations of the received OFDM signal, wherein each N frequency domain representation is associated to one carrier;

a decoder adapted to perform a decoding process on the demodulated OFDM signal, wherein the decoding process groups the received demodulated OFDM signal in word code, $Y=(y_1, y_2)$, being representative of the received OFDM signal during two signaling periods (STBC) or two parallel channels (SFBC);

wherein the decoder is further adapted to decode the word code, $Y=(y_1, y_2)$, in order to compute the transmitted symbols $x_1$ and $x_2$ in accordance with a formulation, $$\begin{bmatrix} y_1 \\ y_2^* \end{bmatrix} = \begin{bmatrix} h_1 & h_2 \\ \tilde{h}_2^* & -\tilde{h}_1^* \end{bmatrix} \begin{bmatrix} x_1 \\ x_2 \end{bmatrix} + \begin{bmatrix} n_1 \\ n_2^* \end{bmatrix}$$

Or $$y = Hx + n$$

where H is a matrix, $h_1$ and $h_2$ are representative of the channel applicable to the transmission of $x_1$ and $x_2$ while $\tilde{h}_1'$ and $\tilde{h}_2$ are representative of the channel applicable to the transmission of $-x_2^*$ and $x_1^*$, and wherein $n_1$ and $n_2$ are noise;

wherein the decoder is further adapted to apply a lattice reduction algorithm on said matrix H, $H=(b_1, b_2)$, in order to transform said matrix H in a reduced matrix Hred, $Hred=(b'_1, b'_2)$, comprising vectors that are substantially orthogonal, wherein the lattice reduction algorithm on each carrier k is based on an iterative algorithm that was initialized based on values $(b_1^{k-1}, b_2^{k-2})$ computed at a preceding iteration; and wherein when the decoder applies the lattice reduction algorithm, the decoder is further configured to check a correlation by determining whether:
IRe $\{<b_1, b_2>\}|\le \frac{1}{2}\|b_1\|^2$ and
IIm $\{<b_1, b_2>\}|\le \frac{1}{2}\|b_1\|^2$, and, if the correlation is not true, then
replace $b_2$ with $$b_2 - \left\lfloor \frac{(b_1, b_2)}{\|b_1\|^2} \right\rfloor b_1$$

and check the correlation again; and a detector adapted to detect received symbols using the reduced matrix Hred.

6. The receiver of claim 5, wherein the coding is a STBC coding such that the transmission of symbol $x_1$ (resp. $x_2$) and symbol $-x_2^*$(resp. $x_1^*$) occur during two consecutive OFDM frames.

7. The receiver of claim 5, wherein the coding is a SFBC coding such that the transmission of symbol $x_1$ (resp. $x_2$) and symbol $-x_2^*$(resp. $x_1^*$) occur through two consecutive carriers in one OFDM frame.

8. The receiver of claim 5, wherein the decoder is further adapted to test the length of $b_1$ and $b_2$.

9. The receiver of claim 8, wherein the decoder, when applying the lattice reduction algorithm, is applying the lattice reduction algorithm in combination with a ZF, MF, DF or PDF detector.

10. The receiver of claim 5, wherein the receiver is comprised within a mobile communication device adapted for use in an OFDM communication network.

* * * * *